(12) United States Patent
Kin

(10) Patent No.: US 11,643,854 B2
(45) Date of Patent: May 9, 2023

(54) VEHICLE HANDLE DEVICE AND ROTATION OPERATION CLIP

(71) Applicant: ALPHA CORPORATION, Kanagawa (JP)

(72) Inventor: Lan Kin, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 118 days.

(21) Appl. No.: 17/111,846

(22) Filed: Dec. 4, 2020

(65) Prior Publication Data

US 2021/0087860 A1 Mar. 25, 2021

Related U.S. Application Data

(63) Continuation of application No. PCT/JP2019/023676, filed on Jun. 14, 2019.

(30) Foreign Application Priority Data

Jun. 15, 2018 (JP) .............................. JP2018-114266
Jun. 10, 2019 (JP) .............................. JP2019-107881

(51) Int. Cl.
*E05B 85/10* (2014.01)
*E05B 79/20* (2014.01)

(52) U.S. Cl.
CPC .............. *E05B 85/10* (2013.01); *E05B 79/20* (2013.01)

(58) Field of Classification Search
CPC .......... E05B 79/10; E05B 79/12; E05B 79/14; E05B 79/16; E05B 79/18; E05B 79/20;
(Continued)

(56) References Cited

U.S. PATENT DOCUMENTS 6,053,458 A * 4/2000 Meyer .................. F16L 3/1075
248/74.1
2004/0244145 A1 12/2004 Anscher
(Continued)

FOREIGN PATENT DOCUMENTS

JP H06-022616 U 3/1994
JP 2004-360910 A 12/2004
(Continued)

OTHER PUBLICATIONS

International Search Report issued in PCT/JP2019/023676; dated Aug. 20, 2019.
(Continued)

*Primary Examiner* — Christine M Mills
*Assistant Examiner* — Christopher F Callahan
(74) *Attorney, Agent, or Firm* — Studebaker & Brackett PC

(57) ABSTRACT

A vehicle handle device configured to operate a door lock device by transmitting an operation force of an operator via a cable device, the vehicle handle device includes an operation member configured to apply the operation force to the cable device by operation of the operator, and a handle case configured to accommodate the operation member. The handle case includes a cable fixing base portion in which the cable device is configured to be disposed, a cap portion configured to fix the cable device to the cable fixing base portion, and a hinge portion which is provided on the cable fixing base portion and the cap portion and is configured to rotate the cap portion relative to the cable fixing base portion.

8 Claims, 9 Drawing Sheets

(58) Field of Classification Search
CPC .......... E05B 79/22; E05B 79/06; E05B 85/10;
E05B 85/12; E05B 85/13; E05B 85/14;
E05B 85/16; E05B 85/18; E05B 7/00;
E05B 1/0053; Y10T 292/57
See application file for complete search history.

(56) References Cited

U.S. PATENT DOCUMENTS

| | | |
|---|---|---|
| 2004/0244149 A1 | 12/2004 | Anscher |
| 2005/0210631 A1 | 9/2005 | Anscher |
| 2007/0018057 A1 | 1/2007 | Kovac |
| 2013/0088022 A1 | 4/2013 | Collado et al. |
| 2013/0240684 A1* | 9/2013 | Meyers ................ H02G 3/32 |
| | | 248/74.1 |
| 2014/0076094 A1 | 3/2014 | Mori et al. |
| 2015/0247347 A1 | 9/2015 | Suzumura et al. |
| 2019/0249464 A1 | 8/2019 | Sugimoto et al. |

FOREIGN PATENT DOCUMENTS

| | | | |
|---|---|---|---|
| JP | 2013-536341 A | 9/2013 | |
| JP | 2014-062441 A | 4/2014 | |
| JP | 2017-014716 A | 1/2017 | |
| JP | 2018-071244 A | 5/2018 | |
| WO | WO-0049254 A1 * | 8/2000 | ............. E05B 79/12 |
| WO | WO-2010079800 A1 * | 7/2010 | ............. E05B 85/12 |
| WO | WO-2012027265 A1 * | 3/2012 | ............. E05B 85/12 |
| WO | WO-2012050214 A1 * | 4/2012 | ............. E05B 79/20 |

OTHER PUBLICATIONS

The extended European search report issued by the European Patent Office dated Jan. 25, 2022, which corresponds to European Patent Application No. 19818555.5-1005 and is related to U.S. Appl. No. 17/111,846.

An Office Action; "Notice of Reasons for Refusal," mailed by the Japanese Patent Office dated Feb. 7, 2023, which corresponds to Japanese Patent Application No. 2019-107881 and is related to U.S. Appl. No. 17/111,846; with English language translation.

* cited by examiner

VEHICLE HANDLE DEVICE AND ROTATION OPERATION CLIP

CROSS REFERENCE TO RELATED APPLICATIONS

This application claims priority from PCT application No. PCT/JP2019/023676, which was filed on Jun. 14, 2019 based on Japanese Patent Application No. 2018-114266 filed on Jun. 15, 2018 and Japanese Patent Application No. 2019-107881 filed on Jun. 10, 2019, the entire contents of which are incorporated herein by reference.

BACKGROUND OF THE INVENTION

Field of the Invention

The present invention relates to a vehicle handle device and a rotation operation clip.

Description of Related Art

In the related art, a vehicle handle device for opening a door of a vehicle has been known. The handle device is provided, for example, on a side door. The side door is provided with a door lock device that engages a vehicle body and holds the side door in a closed state, and the door lock device and the handle device are connected via a cable device. The cable device includes an inner cable and a hollow outer cable, and the inner cable is slidably inserted into the outer cable. When the handle device is operated by an operator, an operation force of the operator is transmitted to the door lock device via a cable device (inner cable), and thereby, the door lock device is operated In addition to a handle operated by the operator, the handle device includes a handle case that accommodates the handle. The handle case includes a cable fixing base portion on which an outer cable of the cable device is disposed, a cap portion that fixes the outer cable to the cable fixing base portion, and a thin plate-shaped hinge portion that rotates the cap part relative to the cable fixing base portion. The handle case is manufactured as an integrally molded product in which the cable fixing base portion and the cap portion are connected to each other with a hinge portion separated in a state in which the cable fixing base portion and the cap portion are linearly open. The handle case is shipped to perform a manufacturing process of a vehicle as a part of components of the handle device.

In the manufacturing process of the vehicle, the outer cable of the cable device is fixed to the cable fixing base portion. Specifically, first, an end portion of the outer cable is disposed on the cable fixing base portion. Next, the cap portion is rotated around the hinge portion, and the cap portion and the cable fixing base portion are fixed in a state in which the cap portion faces the cable fixing base portion. Accordingly, the outer cable is clamped between the cable fixing base portion and the cap portion, and the outer cable is fixed to the cable fixing base portion.

For example, Patent Literature 1 discloses a structure for fixing a cable device in a door lock device for a vehicle. In the vehicle door lock device, one end portion of an outer tube of an operation cable is fixed to a housing and a cover. The cover is constructed separately from the housing, and is assembled to the housing so as to be attachable to and detachable from the housing and rotatable between an open state and a closed state. Further, in Patent Literature 1, the housing and the cover are provided with a temporary retaining unit. The temporary fixing unit is used for temporarily holding the cover in an open state relative to the housing in a state in which the cover is rotatably assembled to the housing.

[Patent Literature 1] JP-A-2014-62441

When a thin plate-shaped hinge portion is realized in an integrally molded product, if the thickness of the hinge portion increases, the hinge portion may be distorted and cracked when the cap portion is rotated. In contrast, when the thickness of the hinge portion is set to be thin, a short shot may occur at the time of molding, and a crack may occur. In addition, in the case of a thin plate-shaped hinge portion, the rotation trajectory of the cap portion becomes unstable, and the workability is reduced. This problem is not limited to the handle device. For example, when the outer cable is clamped and fixed between the cap portion and the cable fixing base portion on the door lock side, or when the cap portion is rotated toward the body portion via the hinge portion, the same applies to the rotation operation clip for holding and fixing other members.

SUMMARY

One or more embodiments provide a vehicle handle device and a rotation operation clip, which have a structure excellent in moldability and have excellent workability during fixing.

According to one or more embodiments, a vehicle handle device is configured to operate a door lock device by transmitting an operation force of an operator via a cable device. The vehicle handle device includes an operation member configured to apply the operation force to the cable device by operation of the operator, and a handle case configured to accommodate the operation member. The handle case includes a cable fixing base portion in which the cable device is configured to be disposed, a cap portion configured to fix the cable device to the cable fixing base portion, and a hinge portion which is provided on the cable fixing base portion and the cap portion and is configured to rotate the cap portion relative to the cable fixing base portion. The handle case is integrally molded so as to be continuous from the cable fixing base portion to the cap portion via a connection piece provided on the hinge portion. The connection piece is configured to be broken due to a rotational force to rotate the cap portion around the hinge portion.

According to one or more embodiments, the vehicle handle device is configured to operate a door lock device by transmitting an operation force of an operator via a cable device. The vehicle handle device includes an operation member configured to apply the operation force to the cable device by operation of the operator, and a handle case configured to accommodate the operation member. The handle case includes a cable fixing base portion in which the cable device is configured to be disposed, a cap portion configured to fix the cable device to the cable fixing base portion, and a hinge portion configured to rotate the cap portion relative to the cable fixing base portion. The hinge portion includes a shaft body portion provided on one of the cable fixing base portion and the cap portion, and a holding portion which is provided on the other one of the cable fixing base portion and the cap portion and is configured to hold the shaft body portion rotatably. The handle case includes a connection piece to which a breaking force is applied when the cap portion is rotated, and the handle case is integrally molded so as to be continuous from the cable fixing base portion to the cap portion via the connection piece.

According to one or more embodiments, a rotation operation clip includes a body portion, a cap portion which is engaged with the body portion and is configured to clamp and fix other members together with the body portion, and a hinge portion which is provided on the body portion and the cap portion and rotates the cap portion relative to the body portion. The body portion and the cap portion are integrally molded via a connection piece provided on the hinge portion. The connection piece is configured to be broken due to a rotational force to rotate the cap portion around the hinge portion.

DETAILED DESCRIPTION

Figure 1:
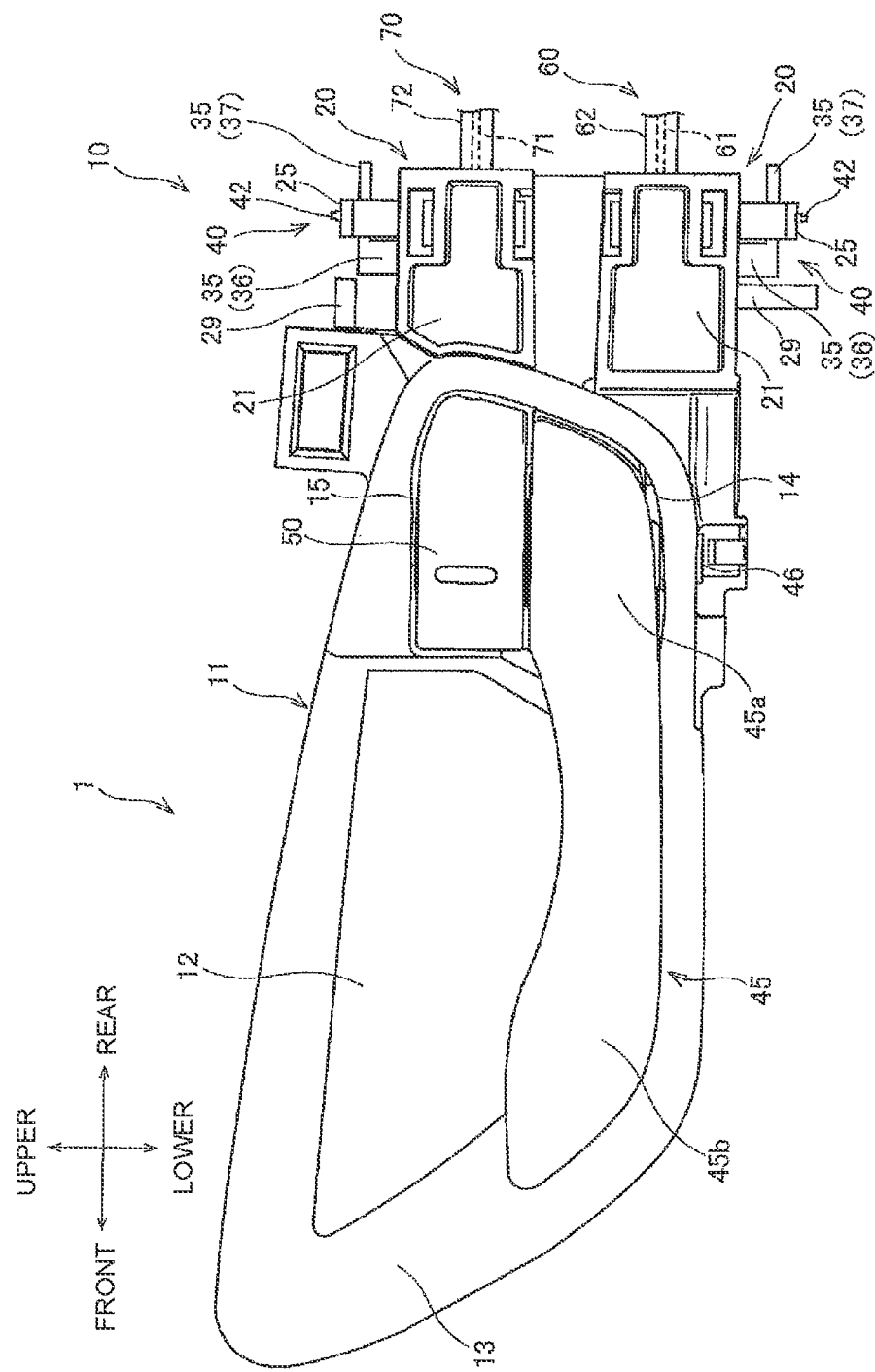
FIG. 1 is a front view schematically showing an inside door handle device according to a first embodiment.
Figure 2:
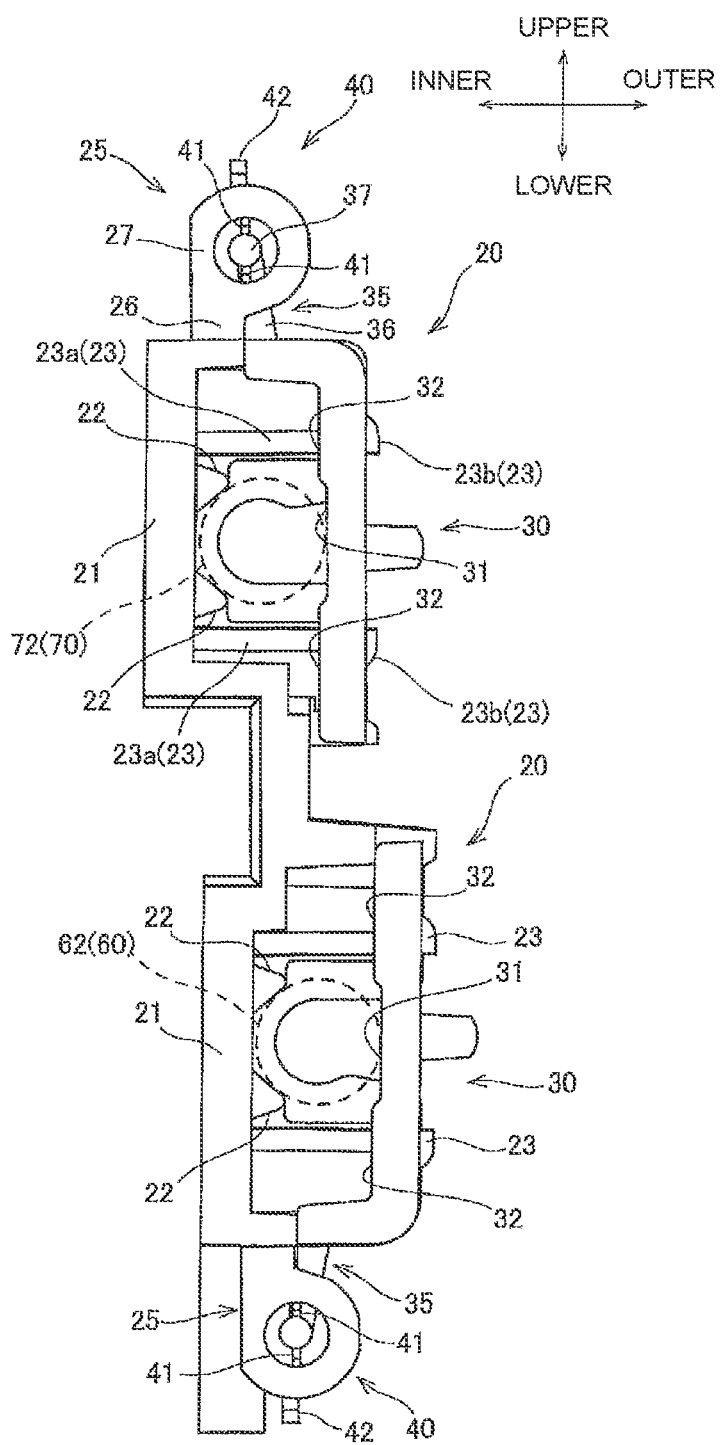
FIG. 2 is a side view showing a main part of the inside door handle device shown in FIG. 1.

Hereinafter, a vehicle handle device according to the present embodiment will be described by illustrating an inside door handle device 1 applied to a side door of a vehicle. Here, FIG. 1 is a front view schematically showing the inside door handle device 1 according to a first embodiment. FIG. 2 is a side view showing a main part of the inside door handle device 1 shown in FIG. 1.

The inside door handle device 1 is a vehicle handle device for performing operation of opening a side door of the vehicle from a vehicle interior side. The inside door handle device 1 is disposed in a door trim that is an interior member that covers an inside of the side door (vehicle interior side), and is fixed to a required position of a door inner panel of the side door. The side door is provided with a door lock device (not shown) including a latch portion that is engaged with a vehicle body and holds the side door in a closed state, and cable devices 60, 70 that connect the door lock device with the inside door handle device 1.

The inside door handle device 1 mainly includes a handle case 10, a handle 45, and a lock knob 50.

The handle case 10 is disposed in an opening portion provided in the door trim and faces the vehicle interior side so as to be formed integrally with the door trim.

The handle case 10 includes a case body 11 and cable holding portions 20.

The case body 11 accommodates the handle 45 and the lock knob 50, and includes a required space for holding the handle 45. The case body 11 includes a flat plate-shaped vertical wall portion 12 and a peripheral wall portion 13 connected to a peripheral edge of the vertical wall portion 12. A cross section of the case body 11, extending along an upper-lower direction, is formed in a substantially U shape with the vertical wall portion 12 as a bottom portion.

A vehicle rear side of the vertical wall portion 12 is provided with a handle holding portion 14 for holding the handle 45, and a lock knob holding portion 15 for holding the lock knob 50.

The handle holding portion 14 is set at a lower position in the case body 11, and the lock knob holding portion 15 is set above the handle holding portion 14 in the handle case 10. The handle 45 and the lock knob 50 are disposed in an upper-lower direction in the case body 11.

The peripheral wall portion 13 is set in a flange shape extending toward the vehicle interior side from a connection portion with the vertical wall portion 12. A shape of a distal end side of the peripheral wall portion 13 is set along a peripheral shape of the opening portion of the door trim, and is designed to be integrated with the door trim.

The cable holding portions 20 are disposed on a vehicle rear side of the case body 11. The cable holding portions 20 have a function of holding the cable device (hereinafter, referred to as "first cable device" as necessary) 60 connected to the handle 45, and the cable device (hereinafter, referred to as "second cable device" as necessary) 70 connected to the lock knob 50. In a state in which the handle case 10 is disposed on the door trim, the cable holding portions 20 are positioned on a back side of the door trim and are hidden by the door trim. A structure of the cable holding portions 20 will be described in detail below.

The handle 45 is an operation member that is operated by an operator to open the side door. The handle 45 is disposed in a lower part in the handle case 10. The handle 45 includes a base portion 45a accommodated in the handle holding portion 14, and an operation portion 45b extending forward of the vehicle from the base portion 45a and to be held by the operator. A pin 46 penetrating the base portion 45a is disposed in the handle holding portion 14 along the upper-lower direction. The handle 45 is rotatably supported by the pin 46. The handle 45 rotates within a range between a closed position at which the handle 45 is accommodated in the case body 11 and an open position at which the handle 45 is rotated to a predetermined position on the vehicle interior side.

The first cable device 60 is a connection member for connecting the handle 45 with the door lock device. One end portion of the first cable device 60 is connected to the handle 45, and the other end portion thereof is connected to the door lock device. The first cable device 60 includes an inner cable 61 and a tubular outer cable 62. The inner cable 61 is inserted into a hollow of the outer cable 62 and can move inside the outer cable 62.

One end portion of the outer cable 62 is fixed to the cable holding portion 20, and the other end portion thereof is fixed to the door lock device. That is, the outer cable 62 is held in a fixed state between the inside door handle device 1 and the door lock device. One end portion of the inner cable 61 is connected to the base portion 45a of the handle 45, and the other end portion thereof is connected to a movable point where the latch portion of the door lock device is operated.

When the handle 45 is in the closed position, the base portion 45a of the handle 45 is accommodated in the handle holding portion 14. In this case, the latch portion of the door lock device is engaged with the vehicle body, and the side door is maintained in a closed state. On the other hand, when the handle 45 is rotated from the closed position to the open position, the inner cable 61 connected to the base portion 45a is pulled. Accordingly, the movable point of the door lock device connected to the other end of the inner cable 61 is operated, and the engagement state between the latch portion and the vehicle body is released. In this way, when the operator operates the handle 45 to apply an operation force to the first cable device 60, the door lock device is operated to open the side door.

The lock knob 50 is an operation member that is operated by the operator to restrict opening of the side door. The lock knob 50 is disposed in an upper part in the handle case 10. A first boss portion protruding downward is provided on an upper end side of the lock knob holding portion 15. A second boss portion protruding upward is provided on a lower end side of the lock knob holding portion 15 at a position facing the first boss portion. The lock knob 50 is rotatably supported by the first boss portion and the second boss portion. The lock knob 50 rotates within a range between a closed position at which the lock knob 50 is accommodated in the case body 11 and an open position at which the lock knob 50 is rotated to a predetermined position on the vehicle interior side.

The second cable device 70 is a connection member for connecting the lock knob 50 with the door lock device. One end portion of the second cable device 70 is connected to the lock knob 50, and the other end portion thereof is connected to the door lock device. The second cable device 70 includes an inner cable 71 and a tubular outer cable 72. The inner cable 71 is inserted into a hollow of the outer cable 72 and can move inside the outer cable 72.

One end portion of the outer cable 72 is fixed to the cable holding portion 20 of the handle case 10, and the other end portion thereof is fixed to the door lock device. That is, the outer cable 72 is held in a fixed state between the inside door handle device 1 and the door lock device. One end portion of the inner cable 71 is connected to the lock knob 50, and the other end portion thereof is connected to the door lock device.

When the lock knob 50 is in the closed position, the lock knob 50 is accommodated in the lock knob holding portion 15. In this case, the door lock device comes into an unlocked state in which an application of the operation force to the movable point by the first cable device 60 is enabled. Therefore, it is possible to freely open the side door by the operation of the handle 45. On the other hand, when the lock knob 50 is rotated from the closed position to the open position, the inner cable 71 connected to the lock knob 50 is pulled. Accordingly, the door lock device connected to the other end portion of the inner cable 71 is operated, and comes into a locked state in which the application of the operation force to the movable point by the first cable device 60 is disabled. In the locked state, since the operation of the door lock device by the handle 45 is canceled, the opening of the side door is restricted. In this way, the operator operates the lock knob 50 to apply an operation force to the second cable device 70, such that the door lock device is operated and the opening operation of the side door can be restricted.

Hereinafter, the structure of the cable holding portions 20, which is one of the features of the first embodiment, will be described. The cable holding portions 20 fix the outer cables 62, 72 of the cable devices 60, 70, and are provided corresponding to the two cable devices 60, 70, respectively.

The cable holding portion 20 includes a cable fixing base portion 21 and a cap portion 30. The cable fixing base portion 21 and the cap portion 30 face each other in a manner of being parallel to each other with a required interval therebetween. The outer cables 62, 72 are disposed at the cable fixing base portion 21 positioned inside the vehicle, and are clamped between the cable fixing base portion 21 and the cap portion 30, thereby being fixed.

The cable fixing base portion 21 has a substantially flat plate shape. For the purpose of weight reduction, a thinned region and a lightening region are set at appropriate positions in the cable fixing base portion 21.

A pair of protrusions 22 protruding toward the cap portion 30 side is provided on the cable fixing base portion 21 along each of the outer cables 62, 72. The pair of protrusions 22 are disposed in parallel at a predetermined interval and positioned on both sides of each of the outer cables 62, 72 with the outer cables 62, 72 being disposed on the cable fixing base portion 21. The pair of protrusions 22 have a function of positioning the outer cables 62, 72 and preventing positional deviation of the outer cables 62, 72.

Further, the cable fixing base portion 21 is provided with claw portions 23 for fixing the cap portion 30. The claw portion 23 includes a pillar portion 23a erected from the cable fixing base portion 21 to the cap portion 30, and an engaging claw 23b positioned at a distal end of the pillar portion 23a. The claw portions 23 are respectively engaged with claw receiving portions 32 provided on the cap portion 30 to fix the cap portion 30 in a state in which each of the outer cables 62, 72 is clamped. In the present embodiment, two sets of claw portions 23 are prepared and each set are disposed facing each other with a predetermined interval so as to clamp the pair of protrusions 22.

The cap portion 30 is a member for fixing each of the outer cables 62, 72 to the cable fixing base portion 21. The cap portion 30 has a substantially flat plate shape. The cap portion 30 is provided with a clamping portion 31 for clamping each of the outer cables 62, 72 between the clamping portion 31 and the cable fixing base portion 21. When each of the outer cables 62, 72 is clamped between the clamping portion 31 and the cable fixing base portion 21, the clamping portion 31 abuts against an outer surface of each of the outer cables 62, 72.

In the cap portion 30, the claw receiving portions 32 for respectively engaging with the claw portions 23 are provided on both sides of the clamping portion 31. The claw receiving portion 32 includes an opening portion 32a (see FIG. 5 or FIG. 6 described below) through which the engaging claw 23b on the distal end side of the claw portion 23 is inserted, and an engaging portion 32b (see FIG. 5 or FIG. 6 described below) to be engaged with the engaging claw 23b that has passed through the opening 32a.

The cable holding portion 20 further includes a hinge portion 40 that is provided on the cable fixing base portion 21 and the cap portion 30 and rotates the cap portion 30 relative to the cable fixing base portion 21. The hinge portion 40 can rotate the cap portion 30 between a fixing position at which the cap portion 30 faces the cable fixing base portion 21 and clamps each of the outer cables 62, 72 between the cable fixing base portion 21 and the cap portion 30, and an open position at which the cap portion 30 is open at a constant opening angle relative to the cable fixing base portion 21. In the present embodiment, the open position is set to an opening angle (for example, about 180°) in which the cable fixing base portion 21 and the cap portion 30 form a straight line shape via the hinge portion 40.

The hinge portion 40 includes a holding portion 25 provided on the cable fixing base portion 21, and a shaft body portion 35 provided on the cap portion 30. The hinge portion 40 includes a hinge mechanism by which the shaft body portion 35 can be rotatably held by the holding portion 25.

The holding portion 25 includes a base portion 26 extending from an end portion of the cable fixing base portion 21, and a cylindrical portion 27 provided at a distal end of the base portion 26. The cylindrical portion 27 is a tubular member whose interior is hollowed out along a front-rear direction of the vehicle. The cylindrical portion 27 rotatably holds the shaft body portion 35 in a state in which the shaft body portion 35 (a rotation shaft 37 described below) is inserted into the interior of the cylindrical portion 27.

The shaft body portion 35 includes a support portion 36 extending from an end portion of the cap portion 30, and a rotation shaft 37 orthogonal to a distal end of the support portion 36. The rotation shaft 37 is inserted into a hollow portion of the cylindrical portion 27 and is held by the cylindrical portion 27.

As shown in FIG. 1, the cable holding portion 20 includes a restriction portion 29 that faces the holding portion 25 so as to clamp the support portion 36 of the shaft body portion 35 between the holding portion 25 and the restriction portion 29. The restriction portion 29 restricts a position of the shaft body portion 35. The shaft body portion 35 can be prevented from falling off from the holding portion 25 by restricting the position of the shaft body portion 35, such that the shaft body portion 35 has a function of guiding the rotation of the cap portion 30.

Figure 3:
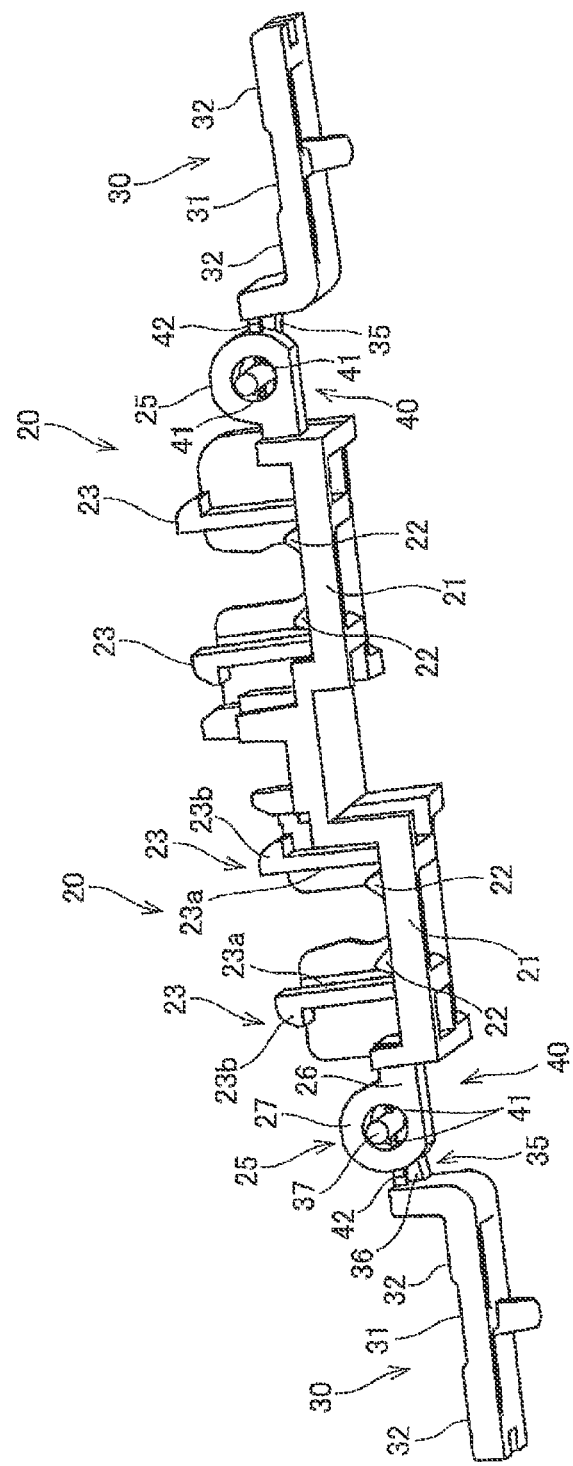
FIG. 3 is a perspective view showing a cable holding portion integrally molded.
Figure 4:
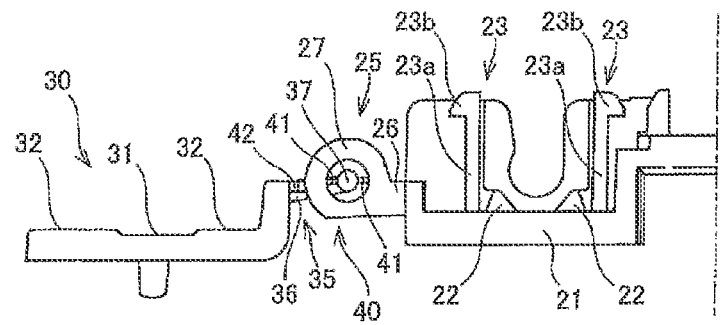
FIG. 4 is a side view showing a main part of the cable holding portion shown in FIG. 3.
Figure 5:
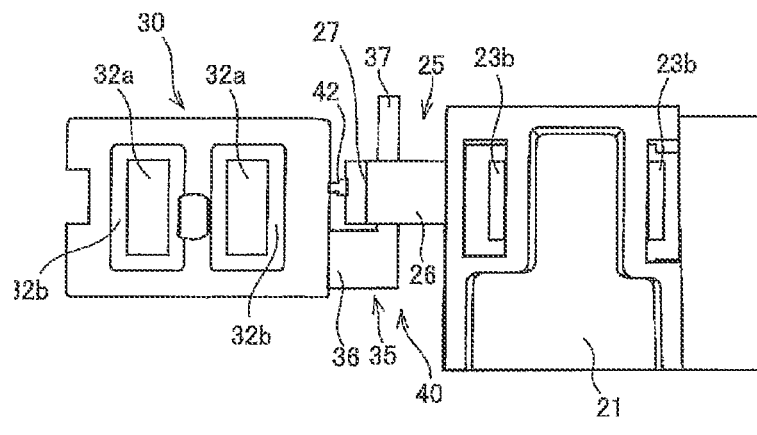
FIG. 5 is a front view showing a main part of the cable holding portion shown in FIG. 3.
Figure 6:
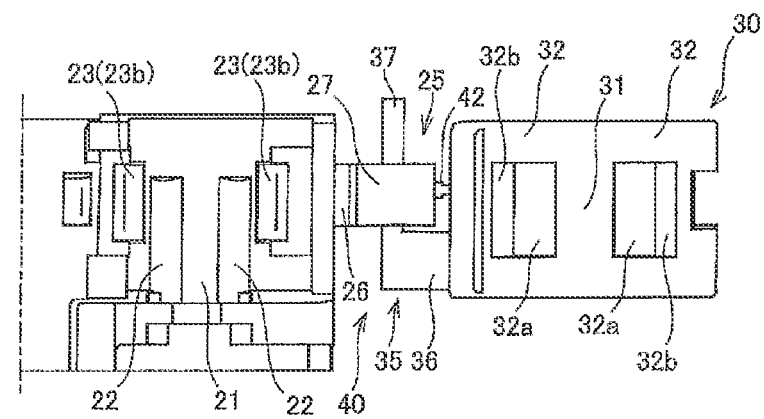
FIG. 6 is a back view showing a main part of the cable holding portion shown in FIG. 3.

Hereinafter, the handle case 10 integrally molded will be described. Here, FIG. 3 is a perspective view showing the cable holding portion 20 integrally molded. FIG. 4 is a side view showing a main part of the cable holding portion 20 shown in FIG. 3, FIG. 5 is a front view showing a main part of the cable holding portion 20 shown in FIG. 3, and FIG. 6 is a back view showing a main part of the cable holding portion 20 shown in FIG. 3.

The handle case 10 is integrally molded by using a required resin. In this case, the cable holding portion 20 is configured such that the cable fixing base portion 21 and the cap portion 30 are integrated via connection pieces 41, 42 (the first connection piece 41, the second connection piece 42) provided on the hinge portion 40. The cable holding portion 20 is in a state in which the cap portion 30 is linearly open relative to the cable fixing base portion 21.

The first connection piece 41 is a thin rod-shaped member for connecting the holding portion 25 with the shaft body portion 35. Specifically, the first connection piece 41 straddles between an inner peripheral wall of the cylindrical portion 27 of the holding portion 25 and an outer peripheral wall of the rotation shaft 37 of the shaft body portion 35. The two first connection pieces 41 are set, and are disposed symmetrically about the rotation shaft 37. The holding portion 25 and the shaft body portion 35, which forms the hinge portion 40, are connected via the first connection piece 41, and the cable fixing base portion 21 and the cap portion 30 are continuous. The holding portion 25 and the shaft body portion 35 are integrated via the first connection pieces 41, such that the rotation of the hinge portion 40 is restricted.

The second connection piece 42 is a thin rod-shaped member for connecting the holding portion 25 that is the hinge portion 40 provided on the cable fixing base portion 21, with the cap portion 30. Specifically, the second connection piece 42 straddles between an outer peripheral wall of the cylindrical portion 27 of the holding portion 25 and the cap portion 30. The hinge portion 40 (the holding portion 25) and the cap portion 30 are connected via the second connection piece 42, and the cable fixing base portion 21 and the cap portion 30 are continuous. The hinge portion 40 and the cap portion 30 are integrated via the second connection piece 42, such that the rotation of the hinge portion 40 is restricted.

Each of the first connection pieces 41 has a stepped shape in which a cross-sectional area of an end portion region connected to the inner peripheral wall of the cylindrical portion 27 is reduced. Similarly, the second connection piece 42 has a stepped shape in which a cross-sectional area of an end portion region connected to the cap portion 30 is reduced. These stepped-shaped parts function as weak portions having breaking strength lower than that of other parts in all regions of the connection pieces 41, 42.

The first connection piece 41 and the second connection piece 42 are set to have desired breaking strength, and receive a shearing force (an example of a breaking force) due to a rotational force to rotate the cap portion 30 around the hinge portion 40, and thus, the first connection piece 41 and the second connection piece 42 are broken. In this case, the weak portion is set in each of the connection pieces 41 and 42, such that a breaking position thereof can be controlled. Accordingly, the breaking of the connection pieces 41, 42 can start from the step-shaped parts (weak portions), and breaking modes of the step-shaped parts can be appropriately controlled.

In other words, the cable holding portion 20 includes the connection pieces 41, 42 to which a shearing force is applied in a rotation direction of the shaft body portion 35, and is integrally molded and continuous from the cable fixing base portion 21 to the cap portion 30 via the connection pieces 41, 42.

When the handle case 10 (the cable holding portion 20) is manufactured as the integrally molded product, the handle case 10 is shipped to perform a manufacturing process of a vehicle. At this time, the cable fixing base portion 21, the cap portion 30, and the hinge portion 40 are connected to one another via the connection pieces 41, 42 (the first connection piece 41, the second connection piece 42), and the rotation of the hinge portion 40 is restricted. Therefore, the cap portion 30 maintains the open position, that is, the state in which the cap portion 30 is open at a constant opening angle relative to the cable fixing base portion 21. Therefore, when handling the handle case 10, the fluttering of the cap portion 30 is prevented.

Figure 7:
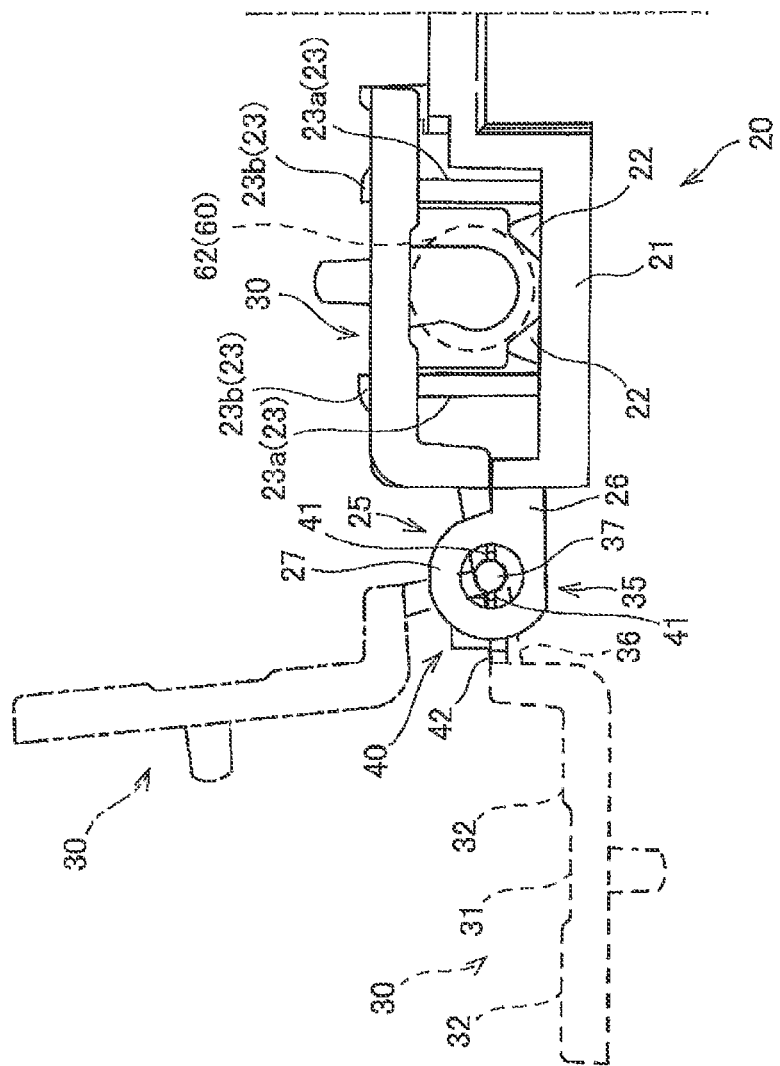
FIG. 7 is an illustrative view showing a step of assembling a cable device to the cable holding portion.

In the manufacturing process of the vehicle, the cable devices 60, 70 are fixed to the cable holding portion 20 of the handle case 10. Hereinafter, the first cable device 60 will be described as an example, but the same applies to the second cable device 70. FIG. 7 is an illustrative view showing a step of fixing the cable device 60 to the cable holding portion 20.

First, an end portion of the outer cable 62 of the first cable device 60 is disposed on the cable fixing base portion 21. At this time, the end portion of the outer cable 62 is disposed on the cable fixing base portion 21 such that the end portion is clamped between the pair of protrusions 22.

Next, a rotational force is applied to the cap portion 30 so as to bend the hinge portion 40 around the rotation shaft 37. When the rotational force is applied to the cap portion 30, a shearing force is applied to the first connection piece 41 and the second connection piece 42 in the rotation direction (a circumferential direction around the rotation shaft 37) of the shaft body portion 35, and the first connection piece 41 and the second connection piece 42 are respectively broken by the shearing force. The breaking separately occurs at the weak portion of the first connection piece 41, that is, a connection part with the cylindrical portion 27, and the weak portion of the second connection piece 42, that is, a connection part with the cap portion 30. Each of the connection pieces 41, 42 is broken, such that the rotation of the rotation shaft 37, that is, the rotation of the cap portion 30 is enabled.

When rotation of the cap portion 30 is enabled, the hinge portion 40 is bent, and the cap portion 30 is allowed to reach the fixing position. In the process of rotating the cap portion 30 to the fixing position, the first connection piece 41 remaining on the rotation shaft 37 of the shaft body portion 35 moves along the inner peripheral wall of the cylindrical portion 27 to maintain the position of the rotation shaft 37, that is, a rotation center of the shaft body portion 35. Therefore, the cap portion 30 can be smoothly rotated in a rotational trajectory as designed.

When the cap portion 30 reaches a vicinity of the fixing position, the claw portion 23 of the cable fixing base portion 21 enters the opening portion 32a of the claw receiving portion 32 provided on the cap portion 30. The clamping portion 31 of the cap portion 30 abuts against the outer cable 62. When the cap portion 30 is further rotated, the cap portion 30 reaches the fixing position. At this time, the engaging claw 23b of the claw portion 23 passes through the opening portion 32a of the claw receiving portion 32 and engages with the engaging portion 32b of the claw receiving portion 32.

When the claw portion 23 engages with the claw receiving portion 32, the posture in which the cap portion 30 faces the cable fixing base portion 21 is maintained, and the outer cable 62 is clamped between the cap portion 30 and the cable fixing base portion 21. Accordingly, the outer cable 62 is fixed to the cable holding portion 20 of the handle case 10.

In this way, the handle case 10 in the present embodiment includes the cable fixing base portion 21 on which the cable devices 60, 70 are to be disposed, the cap portion 30 for fixing the cable devices 60, 70 to the cable fixing base portion 21, and the hinge portion 40 that is provided on the cable fixing base portion 21 and the cap portion 30 and rotates the cap portion 30 relative to the cable fixing base portion 21. In this case, the handle case 10 is integrally molded and is continuous from the cable fixing base portion 21 to the cap portion 30 via the connection pieces 41, 42 provided on the hinge portion 40. The connection pieces 41, 42 are broken due to a rotational force that rotates the cap portion 30 around the hinge portion 40.

According to this configuration, the handle case 10 is continuous from the cable fixing base portion 21 to the cap portion 30 via the connection pieces 41, 42, such that the handle case 10 can be obtained easily as the integrally molded product. The connection pieces 41, 42 can be broken by applying the rotational force to the cap portion 30. Accordingly, the rotation operation of the cap portion 30 for fixing the cable devices 60, 70 can be enabled. In this way, the hinge portion 40 is formed as a rotation structure, such that the hinge portion 40 can be formed as a structure with excellent moldability without a need for a complicated thickness design. The rotation structure is provided, such that the rotational trajectory of the cap portion 30 is stable, and the workability at the time of fixing the cable devices 60, 70 is excellent.

In the present embodiment, the hinge portion 40 includes the shaft body portion 35 provided on the cap portion 30, and the holding portion 25 that is provided on the cable fixing base portion 21 and rotatably holds the shaft body portion 35.

According to this configuration, the hinge portion 40 including the rotation structure can be easily configured. In the present embodiment, the shaft body portion 35 is provided on the cap portion 30, and the holding portion 25 is provided on the cable fixing base portion 21. Alternatively, the holding portion 25 may be provided on the cap portion 30, and the shaft body portion 35 may be provided on the cable fixing base portion 21.

In the present embodiment, the connection pieces 41, 42 include the first connection piece 41 for connecting the shaft body portion 35 with the holding portion 25, and the second connection piece 42 for connecting the cap portion 30 with the holding portion 25.

According to this configuration, a resin flow path, which is continuous from the cable fixing base portion 21 to the cap portion 30 via the connection pieces 41, 42, can be ensured. In addition, in a state of being integrated via the connection pieces 41, 42, the rotation of the hinge portion 40 can be restricted, and the handleability of the handle case 10 can be improved.

In the present embodiment, the handle case 10 is formed in a state in which the cap portion 30 is linearly open relative to the cable fixing base portion 21. Then, the first connection piece 41 and the second connection piece 42 are linearly disposed along the arrangement of the cable fixing base portion 21 and the cap portion 30.

According to this configuration, even when a plurality of handle cases 10 are packed in a stacked state, the height of the plurality of handle cases 10 in a stacking direction can be controlled.

In the present embodiment, the shaft body portion 35 includes the rotation shaft 37, and the support portion 36 that is connected to the end portion of the rotation shaft 37 and supports the rotation shaft 37 inserted into the holding portion 25. The handle case 10 further includes the restriction portion 29 that faces the holding portion 25 so as to clamp the support portion 36 and restricts the position of the shaft body portion 35.

According to this configuration, the shaft body portion 35 can be prevented from falling off from the holding portion 25 by restricting the position of the shaft body portion 35. Accordingly, the rotation operation of the cap portion 30 can be easily performed, and the workability can be improved.

In the present embodiment, the connection pieces 41, 42 includes the weak portions having breaking strength lower than that of other parts in all regions of the connection pieces 41, 42.

According to this configuration, the breaking position in the connection pieces 41, 42 can be controlled, such that the connection pieces 41, 42 can be broken in a desired mode.

In the present embodiment, the weak portion of the first connection piece 41 is set at a position connected to the cylindrical portion 27 of the holding portion 25.

According to this configuration, when the cap portion 30 is rotated to the fixing position, the first connection piece 41 remaining on the rotation shaft 37 of the shaft body portion 35 moves along the inner peripheral wall of the cylindrical portion 27 to maintain the position of the rotation shaft 37, that is, the rotation center of the shaft body portion 35. Therefore, the cap portion 30 can be smoothly rotated. In addition, the cap portion 30 can be rotated in the rotational trajectory as designed, such that the cap portion 30 can be accurately guided to an engagement position with the cable fixing base portion 21. Accordingly, the workability can be improved.

However, the position at which the weak portion is set is any position, and is not limited to the mode shown in the present embodiment. In the present embodiment, the stepped shape, having a small cross-sectional area, as the weak portion is described as an example, and other methods such as a notch shape may be used.

Next, a second embodiment will be described. The inside door handle device 1 according to the second embodiment is the same as that of the first embodiment, but the configurations are partially different. Hereinafter, differences from the first embodiment will be described.

Figure 8:
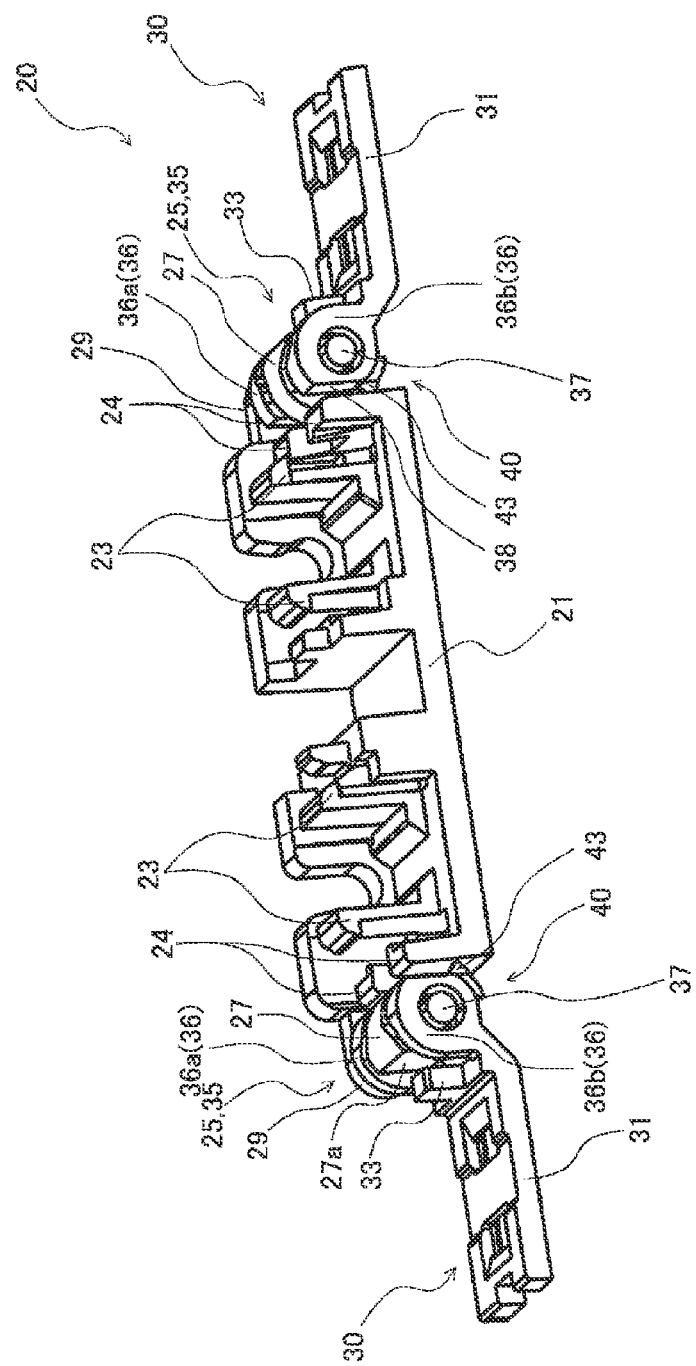
FIG. 8 is a perspective view showing a cable holding portion according to a second embodiment.
Figure 9:
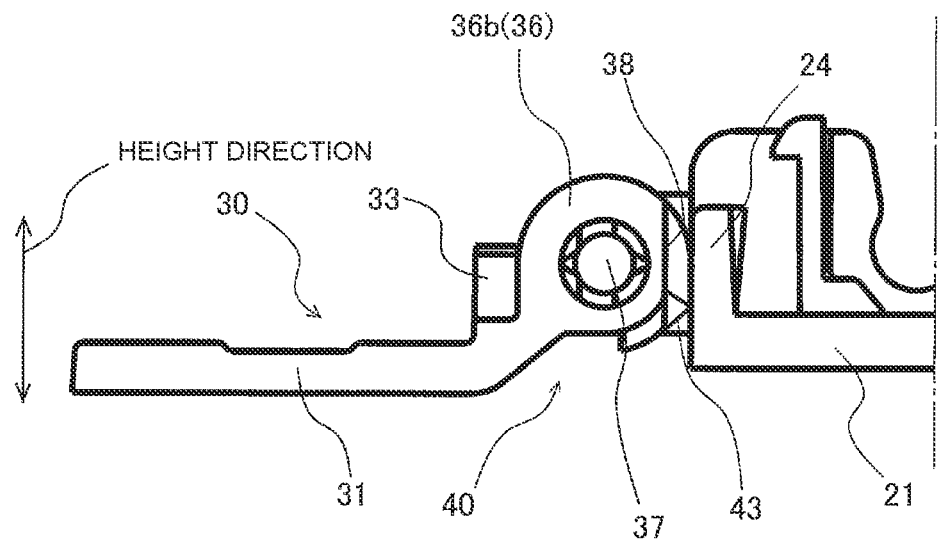
FIG. 9 is a side view showing a main part of the cable holding portion shown in FIG. 8.
Figure 10:
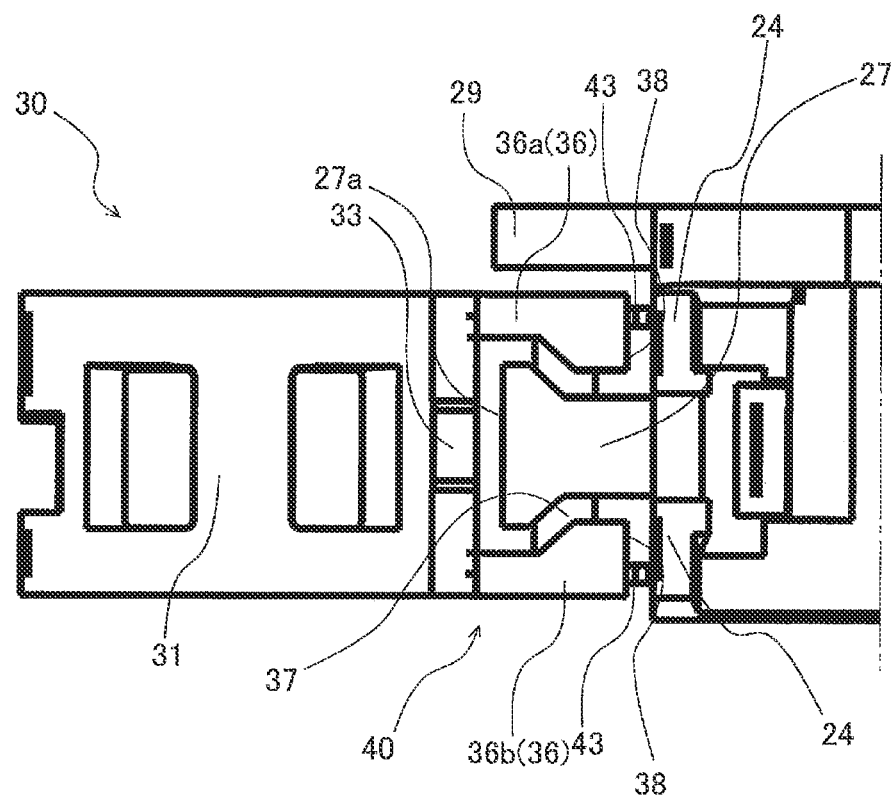
FIG. 10 is a front view showing a main part of the cable holding portion shown in FIG. 8.

FIG. 8 is a perspective view showing a cable holding portion according to the second embodiment, FIG. 9 is a side view showing a main part of the cable holding portion shown in FIG. 8, and FIG. 10 is a front view of a main part of the cable holding portion shown in FIG. 8.

As in the first embodiment, the cable holding portion 20 shown in FIGS. 8 to 10 includes the cable fixing base portion 21, the cap portion 30, and the hinge portion 40.

The cable fixing base portion 21 is formed in a substantially flat plate shape in the first embodiment, and the cable fixing base portion 21 according to the second embodiment includes end walls 24 formed at both end portions thereof. Two end walls 24 are formed on one end portion, and two end walls 24 are formed on the other end portion. The end wall 24 is formed in a manner of protruding in the same direction as that of the claw portion 23.

In the second embodiment, the cap portion 30 includes not only the clamping portion 31 for clamping and fixing the outer cables 62, 72 (see FIG. 1) but also a quadrangular prism-shaped rib 33 protruding from the clamping portion 31. The rib 33 protrudes from a central portion of the cap portion 30 in the width toward a rotation direction side when the cap portion 30 is to be engaged with the cable fixing base portion 21.

In the holding portion 25, a planar flat wall portion 27a is formed on a peripheral wall of cylindrical portion 27. The flat wall portion 27a faces the rib 33 with a predetermined clearance in an open longitudinal direction when the integrally molded product is in an open state. That is, when the cap portion 30 is not rotated, the rib 33 and the peripheral wall (the flat wall portion 27a) of the cylindrical portion 27 are separated from each other.

In the second embodiment, the shaft body portion 35 includes two support portions 36. The two support portions 36 are respectively provided on one end side and the other end side of the rotation shaft 37, and support the one end side and the other end side of the rotation shaft 37. A support portion 36a on the one end side is connected to the one end side of the rotation shaft 37 and supports the rotation shaft 37. The support portion 36a on the one end side has a shape that bulges toward an outer circumferential direction of the rotation shaft 37, as compared with the support portion in the first embodiment. A support portion 36b on the other end side forms an enclosing portion covering the rotation shaft 37 in a circumferential shape on the other end side of the rotation shaft 37, and encloses and supports the rotation shaft 37 in a state of being separated from the rotation shaft 37.

A planar flat wall portion 38 is formed on each of the two support portions 36a, 36b. The flat wall portion 38 faces the end wall 24 with a predetermined clearance in the open longitudinal direction when the integrally molded product is in an open state. That is, when the cap portion 30 is not rotated, the two support portions 36a, 36b (the flat wall portion 38) and the end wall 24 are separated from each other.

Figure 11:
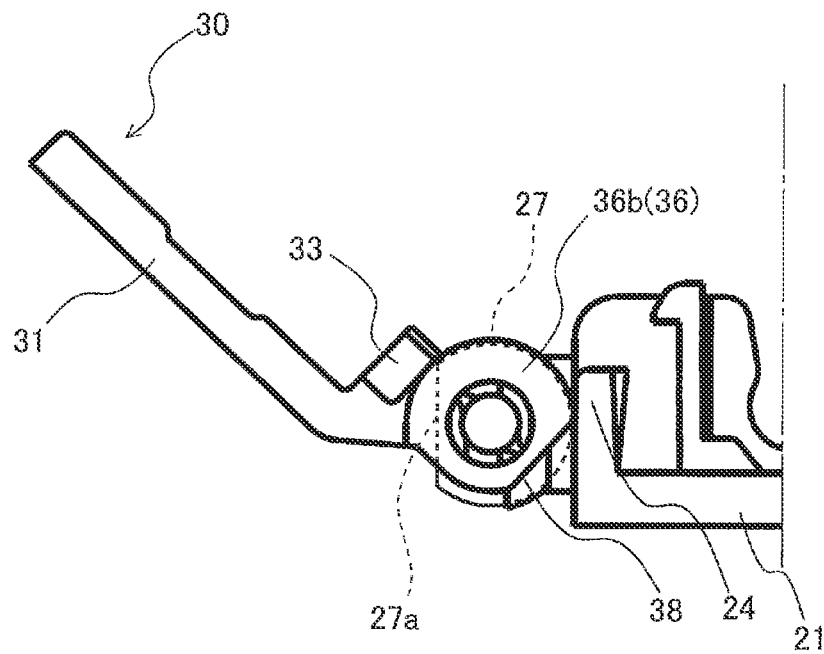
FIG. 11 is a second side view showing a main part of the cable holding portion shown in FIG. 8.

FIG. 11 is a second side view showing a main part of the cable holding portion 20 shown in FIG. 8, and shows a state in which the cap portion 30 is rotated by a predetermined amount.

As shown in FIGS. 9 and 10, when the cap portion 30 is not rotated, the rib 33 and the peripheral wall (the flat wall portion 27a) of the cylindrical portion 27 are separated from each other. Similarly, when the cap portion 30 is not rotated, the two support portions 36a, 36b (the flat wall portion 38) and the end wall 24 are separated from each other.

In contrast, when the cap portion 30 to clamp and fix the outer cables 62, 72 (see FIG. 1) is rotated in a predetermined amount toward the cable fixing base portion 21 side, the rib 33 comes into contact with the peripheral wall of the cylindrical portion 27 as shown in FIG. 11. The cylindrical portion 27 includes a part, having a perfect circular shape in a side view, on a portion excluding the flat wall portion 27a. When the cap portion 30 is rotated beyond the predetermined amount, the rib 33 and the perfect circular part of the cylindrical portion 27 maintain a contact state. Therefore, the contact relation continues to be maintained to a completion state in that the clamping and fixing is completed.

Similarly, when the cap portion 30 to clamp and fix the outer cables 62, 72 (see FIG. 1) is rotated in a predetermined amount toward the cable fixing base portion 21 side, the two support portions 36a, 36b come into contact with the end wall 24 as shown in FIG. 11 (FIG. 11 shows a state in which only the support portion 36b is in contact with the end wall 24, but the support portion 36a is also in contact with the end wall 24). Each of the two support portions 36a, 36b includes a part, having a perfect circular shape in a side view, on a portion excluding the flat wall portion 38. When the cap portion 30 is rotated beyond the predetermined amount, the contact relation between the perfect circular part of each of the two support portions 36a, 36b and the end wall 24 is maintained. Therefore, the contact relation continues to be maintained to the completion state in that the clamping and fixing is completed.

Figure 12:
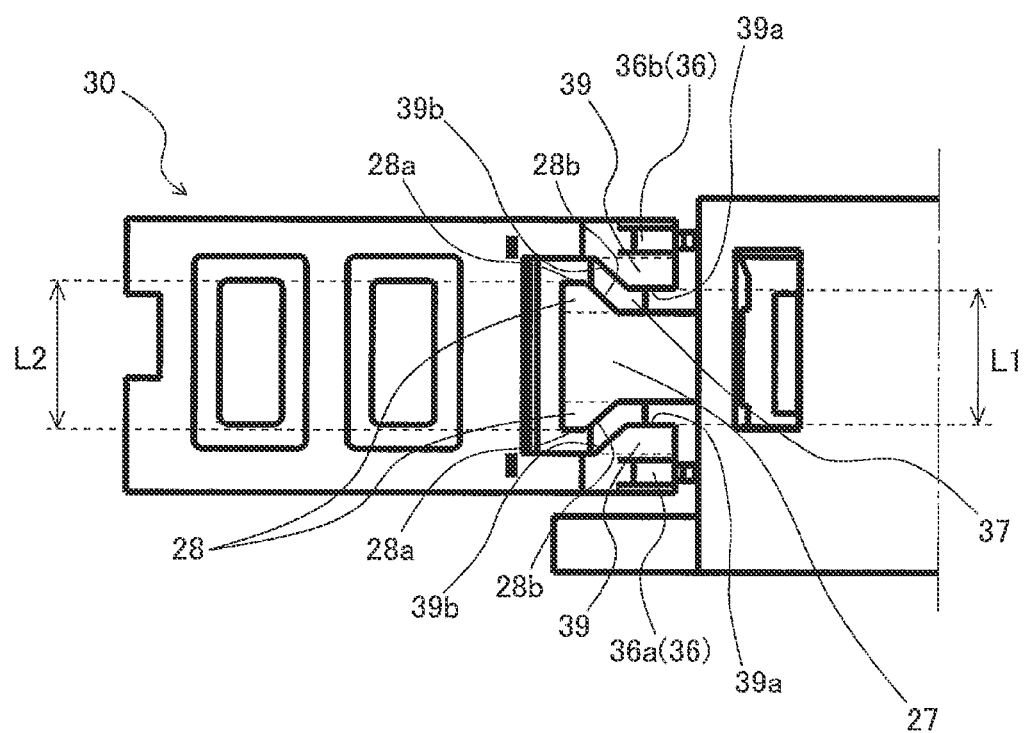
FIG. 12 is a back view showing a main part of the cable holding portion shown in FIG. 8.

FIG. 12 is a back view showing a main part of the cable holding portion 20 shown in FIG. 8. As shown in FIG. 12, the two support portions 36a, 36b include bulging portions 39 that protrude to get closer to each other. Each of the bulging portions 39 includes an orthogonal surface 39a having a plane extending along a plane orthogonal to the rotation shaft 37, and a tapered surface 39b inclined relative to the orthogonal surface 39a.

The cylindrical portion 27 includes protruding portions 28 that respectively protrude toward both of the support portions 36a, 36b. The protruding portion 28 includes an orthogonal surface 28a having a plane extending along a plane orthogonal to the rotation shaft 37, and a tapered surface 28b inclined relative to the orthogonal surface 28a. The tapered surface 28b of the cylindrical portion 27 is inclined in the same direction as the tapered surface 39b of the bulging portion 39.

Here, the bulging portion 39 and the protruding portion 28 are in a state of having gaps having a width equal to or more than a predetermined width in an axial direction when the integrally molded product is in the open state. That is, when the cap portion 30 is not rotated, the bulging portion 39 and the protruding portion 28 are separated from each other. A distance L1 between the orthogonal surfaces 39a of the two support portions 36a, 36b is smaller than a distance L2 between the orthogonal surfaces 28a of the cylindrical portion 27.

Figure 13:
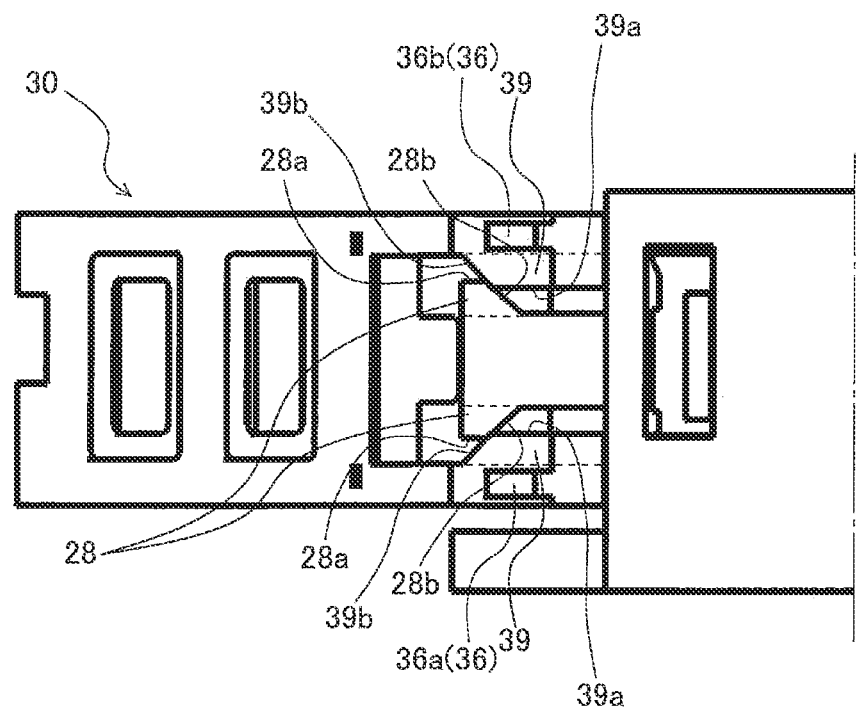
FIG. 13 is a second back view showing a main part of the cable holding portion shown in FIG. 8.

FIG. 13 is a second back view showing a main part of the cable holding portion 20 shown in FIG. 8, and shows a state in which the cap portion 30 is rotated by a predetermined amount. Here, the distance L1 (see FIG. 12) is smaller than the distance L2 (see FIG. 12). Therefore, the tapered surface 28b of the cylindrical portion 27 comes into contact with the tapered surface 39b of the two support portions 36a, 36b. The width of the gap in the axial direction is zero at this time point.

Thereafter, when the cap portion 30 is further rotated, the protruding portions 28 are press-fitted into the bulging portions 39 of the two support portions 36a, 36b by the cooperation of the tapered surfaces 28b, 39b. This press-fitting state continues to be maintained to the completion state in that the clamping and fixing is completed.

In the second embodiment, the press-fitting state between the bulging portions 39 of the two support portions 36a, 36b and the protruding portions 28 continues to be maintained to the completion state in that the clamping and fixing is completed. The relation is not limited to the press-fitting state, and a state in which the width of a gap is less than the predetermined width may continue to be maintained. That is, the press-fitting (contact) state may not be maintained as long as the bulging portions 39 and the protruding portions 28 are configured to reduce the gap in accordance with the rotation.

A position of a connection piece (a third connection piece) 43 according to the second embodiment is different from that of the connection piece in the first embodiment. As shown in FIGS. 9 and 10, the third connection piece 43 according to the second embodiment is, for example, connects to the flat wall portion 38 of each of the two support portions 36a, 36b with the end wall 24. In particular, the third connection piece 43 connects the flat wall portion 38 with the end wall 24 at a position lower than the rotation shaft 37 in a height direction. As a result, when the cap portion 30 is rotated, a tensile force acts on the third connection piece 43. In contrast, when the cap portion 30 is rotated in an opposite direction, a compressive force is applied to the third connection piece 43. In this way, the third connection piece 43 according to the second embodiment may be broken by the tensile force (an example of a breaking force), and is provided at a position to which the compressive force is applied when the cap portion 30 is rotated in the opposite direction.

For example, as shown in FIGS. 8 and 10, the cable holding portion 20 according to the second embodiment includes the restriction portion 29. The restriction portion 29 protrudes from the cable fixing base portion 21 toward the cap portion 30 side. In the second embodiment, the restriction portion 29 clamps the support portion 36a together with the holding portion 25, and prevents the rotation shaft 37 from falling off from the holding portion 25.

Next, the operation of the cable holding portion 20 according to the second embodiment will be described. As shown in FIG. 10, when the integrally molded product is in an open state, the rib 33 and the peripheral wall of the cylindrical portion 27 are separated from each other, and each of the two support portions 36a, 36b and the end wall 24 are separated from each other. Therefore, since both are separated from each other, a die-cutting space is ensured during the manufacturing of a molded product.

When the cap portion 30 is rotated from this separated state, the rib 33 comes into contact with the peripheral wall of the cylindrical portion 27 and each of the two support portions 36a, 36b comes into contact with the end wall 24 when a rotation amount reaches a predetermined amount, for example, as shown in FIG. 11. In this contact state, backlash toward the contact side cannot occur, such that a direction of backlash that can occur in a circumferential direction is limited and the backlash is prevented.

In a state in which the direction of the backlash is limited, the cap portion 30 is engaged with the claw portion 23 of the cable fixing base portion 21 shown in FIG. 8.

When the integrally molded product is in an open state, a gap, which has a width equal to or more than the predetermined width, exists in the axial direction between the bulging portion 39 and the protruding portion 28 as shown in FIG. 12. Therefore, since both are separated from each other, a die-cutting space is ensured during the manufacturing of a molded product.

When the cap portion 30 is rotated from this separated state, the tapered surfaces 28b, 39b come into contact with each other when the rotation amount reaches the predetermined amount, for example, as shown in FIG. 13. Then, when the cap portion 30 is further rotated, the protruding portion 28 is press-fitted into the bulging portion 39, and finally, the protruding portion 28 is in a press-fitting state in which orthogonal surfaces 28a, 39a are in contact with each other. In this press-fitting state, the movement of the cap portion 30 in the axial direction is limited, and the cap portion 30 is in a state (a state in which there is no backlash) in which the axial backlash is limited.

The cap portion 30 is rotated with the axial backlash being limited while the orthogonal surfaces 28a, 39a slide, and is engaged with the claw portion 23 of the cable fixing base portion 21 shown in FIG. 8.

As shown in FIG. 9, the third connection piece 43 according to the second embodiment connects the flat wall portion 38 with the end wall 24 at a position lower than the rotation shaft 37 in the height direction. Therefore, even if the third connection piece 43 is broken during the transportation of the integrally molded product, the position of the cap portion 30 is maintained to prevent the deterioration of assemblability. That is, in the second embodiment, the third connection piece 43 is broken by the tensile force generated at the time of rotating the cap portion 30 when the clamping and fixing is performed. Therefore, when the cap portion 30 is rotated in the opposite direction, the compressive force is applied to the third connection piece 43.

As shown in FIG. 9, even if the third connection piece 43 breaks temporarily during the transportation of the integrally molded product, remained third connection piece 43 is located between the flat wall portion 38 and the end wall 24 at a position lower than the rotation shaft 37 in the height direction. As a result, the third connection piece 43 supports the cap portion 30 even when the cap portion 30 rotates such that it hangs down in the opposite direction of the clamping and fixing direction.

That is, the compressive force is applied to the third connection piece 43 due to the rotation of the cap portion 30 in the opposite direction, such that the third connection piece 43 restricts the rotation of the cap portion 30 in the opposite direction by a repulsive force of the compression. Accordingly, even if the third connection piece 43 is broken, the cap portion 30 is prevented from rotating to increase a rotation angle (a rotation angle during the clamping and fixing), and the deterioration of the assemblability due to the increase in the rotation amount is prevented.

As described above, the inside door handle device 1 according to the second embodiment has the same effect as that of the first embodiment.

In the second embodiment, the two support portions 36a, 36b each have a gap with a width equal to or more than the predetermined width in the axial direction relative to the holding portion 25 when the cap portion 30 is not rotated. The width of the gap becomes less than the predetermined width when the cap portion 30 is rotated in a predetermined amount or more.

According to this configuration, the die cutting can be performed by using the gap in the axial direction during the non-rotation, and the gap in the axial direction is reduced during the rotation. Therefore, the axial backlash is limited, and the deterioration of the assemblability due to the occurrence of the backlash can be prevented.

In the second embodiment, a clearance exists between the rib 33 and the peripheral wall of the holding portion 25 and a clearance exists between each of the support portions 36a, 36b and the end wall 24 (the cable fixing base portion 21) when the cap portion 30 is not rotated, and contact states are maintained from a state in that the cap portion 30 is rotated in a predetermined amount or more to the completion state in that the clamping and fixing is completed.

According to this configuration, a clearance exists between the rib 33 and the peripheral wall of the holding portion 25 and a clearance exists between each of the support portions 36a, 36b and the cable fixing base portion 21. Therefore, the die cutting can be performed by using the clearance, and a contact state between the rib 33 and the holding portion 25 and a contact state between each of the support portions 36a, 36b and the cable fixing base portion 21 are maintained from the state in that the cap portion 30 is rotated in a predetermined amount or more to the completion state in that the clamping and fixing is completed. Therefore, during the rotation, the rib 33 comes into contact with the hinge portion 40, and the hinge portion 40 comes into contact with the cable fixing base portion 21. Therefore, the direction in which the backlash occurs can be limited by the contact at the two points, and the deterioration of assemblability due to the occurrence of the backlash can be prevented.

In the second embodiment, the third connection piece 43 is formed at a position at which a force in a compression direction is applied to the third connection piece 43 when the cap portion 30 is rotated toward a side opposite to the cable fixing base portion 21 side via the hinge portion 40.

According to this configuration, even if the third connection piece 43 is broken during the transportation, a remained third connection piece 43 in a broken state is positioned to inhibit the rotation (supported by repulsion due to compression) on the side opposite to the cable fixing base portion 21 side. As a result, the cap portion 30 can be prevented from being rotated from a state in which the third connection piece 43 is broken and the cap portion 30 is greatly rotated toward the opposite side, and the deterioration of assemblability can be prevented.

The vehicle handle device according to the present embodiment has been described above, but the present invention is not limited to the embodiment described above, and various modifications can be made within the scope of the present invention. The techniques of the embodiments may be combined within a possible range. The handle device applied to the side door has been described in the embodiment described above, but the present invention can be applied to various parts such as a back door as the vehicle handle device according to the present invention.

The vehicle handle device according to the present embodiment is not limited to the inside door handle device 1, and may be applied to an outside door handle device. The present invention is not limited to the handle device, and may be applied to, for example, a door lock device for clamping and fixing the outer cables 62, 72 by the cap portion 30 and the cable fixing base portion 21 on a door lock side. In addition, the present invention is not limited to the handle device and the door lock device, and may be applied to a rotation operation clip for clamping and fixing other members by rotating the cap portion 30 toward a body portion via the hinge portion 40.

In the second embodiment, the rib 33 comes into contact with the peripheral wall of the holding portion 25 and each of the support portions 36a, 36b comes into contact with the end wall 24 during the rotation in the predetermined amount, and contact timing of the rib 33 and the support portions 36a, 36b may be different. For example, the rib 33 may be in a contact state during rotation in a first predetermined amount, and the support portions 36a, 36b may be in a contact state during rotation in a second predetermined amount. In addition, similarly, each of the two bulging portions 39 and each of the protruding portions 28 may not be in contact with each other during rotation in a predetermined amount.

In the second embodiment, a position of the third connection piece 43 is not limited to the above-described position as long as it is a position at which the compressive force is applied to the third connection piece 43 during the rotation of the cap portion 30 in the opposite direction.

According to the aspect (1), a vehicle handle device is configured to operate a door lock device by transmitting an operation force of an operator via a cable device. The vehicle handle device includes an operation member configured to apply the operation force to the cable device by operation of the operator, and a handle case configured to accommodate the operation member. The handle case includes a cable fixing base portion in which the cable device is configured to be disposed, a cap portion configured to fix the cable device to the cable fixing base portion, and a hinge portion which is provided on the cable fixing base portion and the cap portion and is configured to rotate the cap portion relative to the cable fixing base portion. The handle case is integrally molded so as to be continuous from the cable fixing base portion to the cap portion via connection pieces provided on the hinge portion. The connection pieces are configured to be broken due to a rotational force to rotate the cap portion around the hinge portion.

According to the aspect (2), the vehicle handle device is configured to operate a door lock device by transmitting an operation force of an operator via a cable device. The vehicle handle device includes an operation member configured to apply the operation force to the cable device by operation of the operator, and a handle case configured to accommodate the operation member. The handle case includes a cable fixing base portion in which the cable device is configured to be disposed, a cap portion configured to fix the cable device to the cable fixing base portion, and a hinge portion configured to rotate the cap portion relative to the cable fixing base portion. The hinge portion includes a shaft body portion provided on one of the cable fixing base portion and the cap portion, and a holding portion which is provided on the other one of the cable fixing base portion and the cap portion and is configured to hold the shaft body portion rotatably. The handle case includes connection pieces to which a breaking force is applied when the cap portion is rotated, and the handle case is integrally molded so as to be continuous from the cable fixing base portion to the cap portion via the connection pieces.

According to the aspect (3), the hinge portion preferably includes a shaft body portion provided on one of the cable fixing base portion and the cap portion, and a holding portion which is provided on the other one of the cable fixing base portion and the cap portion and is configured to hold the shaft body portion rotatably.

According to the aspect (4), the connection pieces preferably include a first connection piece configured to connect the shaft body portion with the holding portion, and a second connection piece configured to connect the one of the cable fixing base portion and the cap portion with the holding portion.

According to the aspect (5), the handle case is preferably molded such that the cap portion is linearly open relative to the cable fixing base portion. The first connection piece and the second connection piece are preferably linearly disposed along the arrangement of the cable fixing base portion and the cap portion.

According to the aspect (6), the shaft body portion preferably includes a rotation shaft, and a support portion which is connected to an end portion of the rotation shaft and supports the rotation shaft inserted into the holding portion. The handle case includes a restriction portion which faces the holding portion to clamp the support portion, and is configured to restrict a position of the shaft body portion.

According to the aspect (7), the one of the cable fixing base portion and the cap portion preferably includes a rib. The shaft body portion preferably includes a support portion extending from the one of the cable fixing base portion and the cap portion. The rib preferably has a clearance with a peripheral wall of the holding portion when the cap portion is not rotated. The support portion preferably has a clearance with the cable fixing base portion when the cap portion is not rotated. The rib is preferably in contact with the peripheral wall of the holding portion from a first state in that the cap portion is rotated in a first predetermined amount or more to a completion state in that clamping and fixing is completed. The support portion is preferably in contact with the cable fixing base portion from a second state in that the cap portion is rotated in a second predetermined amount or more to the completion state.

According to the aspect (8), the shaft body portion preferably includes a rotation shaft and two support portions configured to support one end side and the other end side of the rotation shaft inserted into the holding portion. Each of the two support portions preferably has a gap having a width equal to or more than a third predetermined width relative to the holding portion in an axial direction when the cap portion is not rotated. The width of the gap is preferably less than a fifth predetermined width when the cap portion is rotated in a fourth predetermined amount or more.

According to the aspect (9), the connection piece preferably includes a third connection piece which is formed at a position at which a force in a compression direction is applied to the third connection piece when the cap portion is rotated toward a side opposite to the cable fixing base portion side via the hinge portion.

According to the aspect (10), the connection piece preferably includes a weak portion having breaking strength lower than that of other parts in all regions of the connection piece.

According to the aspect (11), a rotation operation clip includes a body portion, a cap portion which is engaged with the body portion and is configured to clamp and fix other members together with the body portion, and a hinge portion which is provided on the body portion and the cap portion and rotates the cap portion relative to the body portion. The body portion and the cap portion are integrally molded via a connection piece provided on the hinge portion. The connection pieces are configured to be broken due to a rotational force to rotate the cap portion around the hinge portion.

According to one or more embodiments, it is possible to provide a vehicle handle device and a rotation operation clip, which have a structure excellent in moldability and have excellent workability during fixing.

What is claimed is:

1. A vehicle handle device configured to operate a door lock device by transmitting an operation force of an operator via a cable device, the vehicle handle device comprising;
an operation member configured to apply the operation force to the cable device by operation of the operator; and
a handle case configured to accommodate the operation member,
wherein the handle case includes:
a cable fixing base portion in which the cable device is configured to be disposed;
a cap portion configured to fix the cable device to the cable fixing base portion; and
a hinge portion configured to rotate the cap portion relative to the cable fixing base portion,
wherein the hinge portion includes:
a shaft body portion provided on one of the cable fixing base portion and the cap portion; and
a holding portion which is provided on the other one of the cable fixing base portion and the cap portion and is configured to hold the shaft body portion rotatably,
wherein the handle case includes a connection piece to which a breaking force is applied when the cap portion is rotated, and the handle case is integrally molded so as to be continuous from the cable fixing base portion to the cap portion via the connection piece,
wherein the one of the cable fixing base portion and the cap portion includes a rib,
wherein the shaft body portion includes a support portion extending from the one of the cable fixing base portion and the cap portion,
wherein the rib has a clearance with a peripheral wall of the holding portion when the cap portion is not rotated,
wherein the support portion has a clearance with the cable fixing base portion when the cap portion is not rotated,
wherein the rib is in contact with the peripheral wall of the holding portion from a first state in that the cap portion is rotated in a first predetermined amount or more to a completion state in that clamping and fixing is completed, and
wherein the support portion is in contact with the cable fixing base portion from a second state in that the cap portion is rotated in a second predetermined amount or more to the completion state.

2. The vehicle handle device according to claim 1,
wherein the shaft body portion includes:
a rotation shaft; and
a support portion which is connected to an end portion of the rotation shaft and supports the rotation shaft inserted into the holding portion, and
wherein the handle case includes a restriction portion which faces the holding portion to clamp the support portion, and is configured to restrict a position of the shaft body portion.

3. The vehicle handle device according to claim 1,
wherein the connection piece includes a third connection piece which is formed at a position at which a force in a compression direction is applied to the third connection piece when the cap portion is rotated toward a side opposite to the cable fixing base portion side via the hinge portion.

4. The vehicle handle device according to claim 1,
wherein the connection piece includes a weak portion having breaking strength lower than that of other parts in all regions of the connection piece.

5. A vehicle handle device configured to operate a door lock device by transmitting an operation force of an operator via a cable device, the vehicle handle device comprising:
an operation member configured to apply the operation force to the cable device by operation of the operator; and
a handle case configured to accommodate the operation member,
wherein the handle case includes:
a cable fixing base portion in which the cable device is configured to be disposed;
a cap portion configured to fix the cable device to the cable fixing base portion; and
a hinge portion configured to rotate the cap portion relative to the cable fixing base portion,
wherein the hinge portion includes:
a shaft body portion provided on one of the cable fixing base portion and the cap portion; and
a holding portion which is provided on the other one of the cable fixing base portion and the cap portion and is configured to hold the shaft body portion rotatably,
wherein the handle case includes a connection piece to which a breaking force is applied when the cap portion is rotated, and the handle case is integrally molded so as to be continuous from the cable fixing base portion to the cap portion via the connection piece,
wherein the shaft body portion includes a rotation shaft and two support portions configured to support one end side and the other end side of the rotation shaft inserted into the holding portion,
wherein each of the two support portions has a gap having a width equal to or more than a third predetermined width relative to the holding portion in an axial direction when the cap portion is not rotated, and
wherein the width of the gap is less than a fifth predetermined width when the cap portion is rotated in a fourth predetermined amount or more.

6. The vehicle handle device according to claim 5,
wherein the handle case includes a restriction portion which faces the holding portion to clamp the support portion, and is configured to restrict a position of the shaft body portion.

7. The vehicle handle device according to claim 5,
wherein the connection piece includes a third connection piece which is formed at a position at which a force in a compression direction is applied to the third connection piece when the cap portion is rotated toward a side opposite to the cable fixing base portion side via the hinge portion.

8. The vehicle handle device according to claim 5,
wherein the connection piece includes a weak portion having breaking strength lower than that of other parts in all regions of the connection piece.

* * * * *